July 31, 1962 J. D. KLING Re. 25,212
CONTROL APPARATUS
Original Filed Nov. 16, 1953
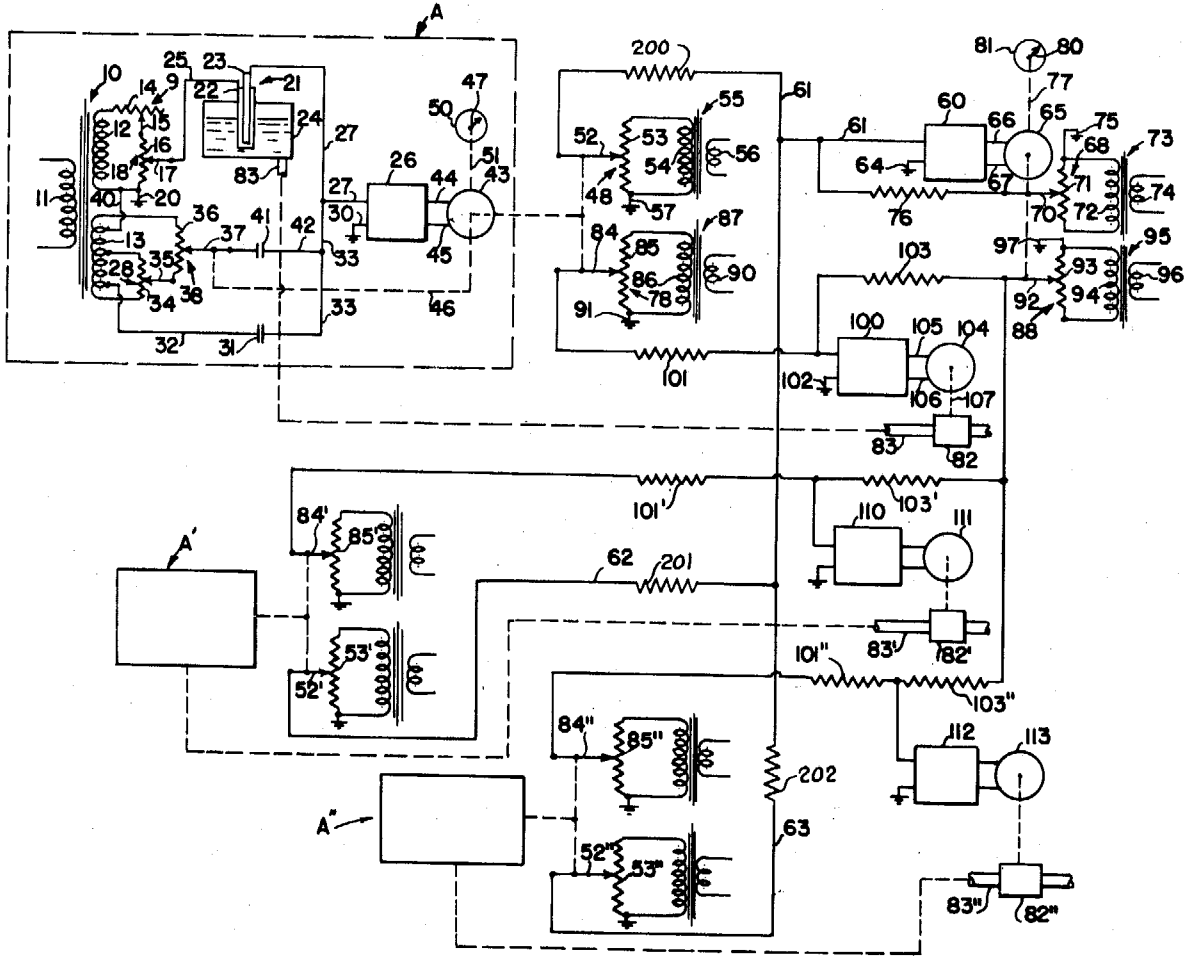
INVENTOR.
JOHN D. KLING
BY George H. Fisher
ATTORNEY United States Patent Office Re. 25,212
Reissued July 31, 1962

25,212
CONTROL APPARATUS

John D. Kling, South Lincoln, Mass., assignor to Minneapolis-Honeywell Regulator Company, Minneapolis, Minn., a corporation of Delaware Original No. 2,817,351, dated Dec. 24, 1957, Ser. No. 395,650, Nov. 16, 1953. Application for reissue June 4, 1959, Ser. No. 818,239
17 Claims. (Cl. 137—98)
(Filed under Rule 47(b) and 35 U.S.C. 118)

Matter enclosed in heavy brackets [ ] appears in the original patent but forms no part of this reissue specification; matter printed in italics indicates the additions made by reissue.

This invention is concerned with flow control apparatus and particularly with apparatus for controlling the flow of fuel from a plurality of containers in an aircraft in order to maintain a desired center of gravity.

Briefly the invention involves utilizing a plurality of rebalanceable networks each having a sensing element immersed in a separate container of fuel for deriving a signal indicative of the quantity of fuel in that container. These fuel quantity signals are added together in a totalizing circuit to operate a wiper arm along a totalizing potentiometer to provide a signal indicative of the percentage of fullness of all the containers. Each of the rebalanceable networks also causes movement of a wiper arm along an individual potentiometer to provide a signal indicative of the percentage of fullness of the individual container. Each of the individual signals are compared with the total signal in separate comparing circuits to operate valves in the output lines of the containers.

It is therefore an object of this invention to design efficient, lightweight apparatus for controlling the flow of fuel from a number of containers in accordance with the relative fullness of each container.

Another object of the invention is to design apparatus for controlling the flow of fuel from a number of containers in accordance with the relative fullness of each container in which the additional components needed are simple and available items.

Another object of the invention is to design apparatus for causing fuel to flow from a plurality of containers such that all of the containers will empty simultaneously.

A still further object of the invention is to design apparatus for causing fuel to flow from a plurality of containers such that the combined center of gravity of the fuel in all the containers remains the same.

For a better understanding of the invention reference is had to the followind detailed description taken in conjunction with the accompanying drawing in which the single FIGURE is a schematic diagram showing a preferred embodiment of the invention.

In the drawing, a quantity measuring circuit A is used to obtain a signal indicative of the quantity of fuel or other liquid in the tank 24 and also to obtain a signal indicative of the percentage of fullness of the liquid in the tank. This quantity measuring circuit A is more fully shown and described in an application to Bancroft, Serial No. 181,747, filed August 28, 1950, now Patent 2,793,529, and assigned to the same assignee as the present invention.

The fuel quantity measuring circuit A utilizes a transformer 10 having a primary winding 11 connected to a source of power, not shown, and pair of secondary windings 12 and 13. A rheostat 9 having a resistor 14 and a wiper arm 15 has one terminal of the resistor connected to the upper end of transformer secondary winding 12. A potentiometer 18 having a resistor 16 and a wiper arm 17 has the resistor 16 connected between the wiper arm 15 of rheostat 9 and the lower end of transformer secondary winding 12. The lower end of transformer secondary winding 12 is also connected to ground terminal 20.

A sensing element 21, shown to be a capacitive type element and hereafter called a tank unit, has an outer electrode 22 and an inner electrode 23 inserted from the upper end of fuel tank 24 to the bottom of the fuel tank. The outer electrode 22 of tank unit 21 is connected to wiper arm 17 of potentiometer 18 by conductor 25. The inner electrode 23 of tank unit 21 is connected to one of the input terminals of amplifier 26 by conductor 27. The other input terminal of amplifier 26 is connected to ground terminal 30. This impresses a voltage across tank unit 21 so that a signal may be obtained from the tank unit.

A capacitor 31 has one electrode connected near the lower end of transformer secondary winding 13 by conductor 32. The other electrode of capacitor 31 is connected to amplifier 26 by conductors 33 and 27.

A potentiometer 28 having a resistor 34 and a wiper arm 35, has the resistor 34 connected between the lower end of transformer secondary winding 13 and a point between the two ends of the secondary winding. A potentiometer 38 having a resistor 36 and a wiper arm 37 has the resistor 36 connected between the upper end of transformer secondary winding 13 and wiper arm 35 of potentiometer 28. Transformer secondary winding 13 is connected near its upper end to ground terminal 20 by conductor 40.

A capacitor 41 has one electrode connected to wiper arm 37 of potentiometer 38 while the other electrode of the capacitor is connected to the ungrounded input terminal of amplifier 26 by conductors 42, 33 and 27.

The signal from capacitor 31 balances out the empty tank signal from tank unit 21 with the signal from capacitor 41 balancing out the signal from the capacitance of tank unit 21 due to fuel in the tank.

Amplifier 26 is connected to a motor 43 by conductors 44 and 45 for operation of motor 43. Motor 43 is mechanically connected to wiper arm 37 of potentiometer 38 by mechanical connection 46. Motor 43 is also connected to the indicator needle 47 of an indicator 50 by mechanical connection 51.

The fuel quantity measuring circuit is calibrated as follows. With wiper arm 37 of potentiometer 38 at the ground potential point of potentiometer resistor 36, wiper arm 15 of rheostat 9 is moved manually along the rheostat resistor 14 until the circuit is near balance, the fuel tank 22 being empty. When the circuit is near balance, that is, the signals due to capacitors 31 and 41 are approximately equal and opposite to the signal due to tank unit 21, wiper arm 17 is moved manually along potentiometer 16 until the circuit is exactly in balance, the indicator needle 47 then indicating no fuel in the tank.

For full calibration the tank 24 is filled, causing motor 43 to move wiper arm 37 downwardly along potentiometer resistor 36. Wiper arm 35 is then moved along potentiometer resistor 34 until the circuit is in balance, the indicator needle 47 then indicating that the tank 24 is full.

Since the figure shows three identical fuel quantity measuring circuits only one is shown in detail, the other two being shown in box form and designated as A′ and A″.

Motor 43 in addition to operating on rebalancing potentiometer 38 also moves a wiper arm 52 along a potentiometer resistor 53 of a potentiometer 48 to obtain a signal indicative of the quantity of fuel in fuel tank 24. Potentiometer resistor 53 is connected across a transformer secondary winding 54 of a transformer 55 having a primary winding 16 connected to a source of power not shown. The lower end of potentiometer resistor 53 is also connected to a ground terminal 57. In a like manner the motors in the other two fuel quantity measuring circuits operate wiper arms 52′ and 52″ along potentiometer resistors 53′ and 53″. The wiper arms 52, 52′, and 52″ are connected through summing resistors 200, 201, and 202 respectively to an input terminal of an amplifier 60 by conductors 61, 62 and 63 respectively to impress on the input circuit of amplifier 60 a signal indicative of the total quantity of fuel in all the tanks. The other input terminal of amplifier 60 is connected to a ground terminal 64. It is understood, of course, that the magnitudes of the voltages impressed across potentiometer resistors 53, 53′ and 53″ are in the same ratio with respect to each other as the maximum quantities of fuel which can be contained in the tanks affecting the signals obtained from the potentiometer resistors. That is, if the maximum capacity of tank 24 is twice that of the tank in circuit A′ and half that of the tank in circuit A″ the voltage across potentiometer resistor 53 is twice the magnitude of the voltage across potentiometer resistor 53′ and half the magnitude of the voltage across potentiometer resistor 53″ in order that each pound of fuel has the same influence on the input circuit of amplifier 60.

Amplifier 60 is connected in operative relation to a motor 65 by conductors 66 and 67. Motor 65 is connected to a wiper arm 70 of a potentiometer 68 having a resistor 71. Potentiometer resistor 71 is connected across a transformer secondary winding 72 of a transformer 73 having a primary winding 74 connected to a source of power, not shown. The upper end of potentiometer resistor 71 is connected to a ground terminal 75. The wiper arm 70 of potentiometer 68 is connected through an isolating resistor 76 back to the ungrounded input terminal of amplifier 60 for rebalancing purposes. Thus, it is seen that when a signal exists on the input terminals of amplifier 60 the motor 65 is caused to operate to move the wiper arm 70 along potentiometer resistor 71 until a signal equal in magnitude but opposite in phase to the signals added together from potentiometer resistors 53, 53′, and 53″ is obtained in order to reduce the input signal to amplifier 60 to zero.

Motor 65 is also connected by mechanical connection 77 to an indicator needle 80 of an indicator 81 for indicating the total quantity of fuel in all the tanks.

All of the apparatus which has been thus far described is shown, described and claimed in the above-mentioned application to Bancroft.

The fuel management, or center of gravity control, portion of the drawing will now be described.

An outlet valve 82 is shown to be included in the output line 83 of fuel tank 24. Valves 82′ and 82″ are included in the output lines 83′ and 83″ of the fuel tanks in the other two fuel quantity measuring circuits A′ and A″ respectively. It is assumed that when all the fuel tanks are full that the combined center of gravity is that center of gravity which is desired. It is therefore desirable to drain all of the fuel tanks in proportion to each other so that they all become empty at the same time. This function is accomplished in the following manner.

The motor 43 of fuel quantity measuring circuit A, in addition to operating upon wiper arm 52 of potentiometer 53, also operates a wiper arm 84 of a potentiometer 78 having a resistor 85. Potentiometer resistor 85 is connected across a transformer secondary winding 86 of a transformer 87 having a primary winding 90 connected to a source of power, not shown. The lower terminal of potentiometer resistor 85 is also connected to ground terminal 91.

In the same manner, the motors of the other two fuel quantity measuring circuits operate wiper arms 84′ and 84″ along potentiometer resistors 85′ and 85″ respectively.

In a similar manner, motor 65, in addition to operating upon wiper arm 70 of rebalancing potentiometer 68, also operates upon wiper arm 92 of potentiometer 88 having a resistor 93. Potentiometer resistor 93 is connected across transformer secondary winding 94 of a transformer 95 having a primary winding 96 connected to a source of power, not shown. The upper terminal of potentiometer resistor 93 is connected to ground terminal 97.

The potentiometer resistors 85, 85′, 85″ and 93 are all of the same magnitude and all have equal voltages impressed across their terminals in order that the signal voltages picked off by the wiper arms moving along these resistors are indicative of the percentage of fullness of the individual tanks and of all the tanks. That is, when each tank is at the same degree of fullness the voltages on all of the wiper arms are the same.

Since the upper terminals of potentiometer resistor 93 are connected to a ground terminal while the lower terminals of potentiometer resistors 85, 85′ and 85″ are connected to ground terminals the voltage signal from potentiometer resistor 93 is of opposite phase to the voltage signals from potentiometer resistors 85, 85′ and 85″.

The voltage signal on wiper arm 84 of potentiometer 78 is impressed on the input circuit of an amplifier 100 through an isolating resistor 101. The other input terminal of amplifier 100 is connected to a ground terminal 102. The wiper arm 92 of potentiometer 88 is also connected to the ungrounded input terminal of amplifier 100 through an isolating resistor 103 where it is compared with the voltage signal from wiper arm 84 of potentiometer 78. Amplifier 100 is connected to a motor 104 by conductors 105 and 106. Motor 104 is connected by mechanical connection 107 to valve 82 in the output line 83 of fuel tank 24.

The various amplifier-motor combinations may be of the kind shown and described in the Upton Patent 2,423,534.

When the voltage signals from potentiometer 78 and 88 are of same magnitude they balance each other out in the input circuit of amplifier 100 and motor 104 is deenergized. As a result, valve 82 remains at its present position, permitting fuel to continue to drain through line 83 in the same magnitude as before. If, however, the two signals on the input circuit of amplifier 100 should become unequal, due to fuel tank 24 draining not rapidly enough or too rapidly the signal on amplifier 100 will be of either a first or a second phase, depending upon which of the signals is larger. This causes motor 104 to rotate in either a first or a second direction to either open or close down valve 82 and speed up or slow down the drainage of fuel from tank 24. When the two signals again become equal in the input circuit of amplifier 100 the amplifier becomes deenergized, causing motor 104 to stop operating and stop the opening or closing of valve 82.

In a like manner the signals from potentiometer resistors 85′ and 93 are impressed on the input circuit of an amplifier 110 through isolating resistors 101′ and 103′ to control the operation of a motor 111 for controlling valve 82′. The signals from potentiometer resistors 85″ and 93 are impressed on the input circuit of an amplifier 112 through isolating resistors 101″ and 103″ for operation of a motor 113 in the same manner.

It is apparent that the flow from any number of fuel tanks may be controlled in this manner, three being shown merely for the sake of example.

There has been shown an apparatus which is capable of controlling the flow of fluid from any number of containers with respect to the amount of fuel in all the containers so that the various containers drain equally. The apparatus used is simple and straight forward and does not require the use of any components not already well known in the art.

While a preferred embodiment of the invention has been shown and described it is realized that modifications can be made by those skilled in the art and it is therefore intended that the invention be defined only to the extent of the appended claims.

I claim as my invention:

1. Comparing apparatus for a plurality of containers comprising, in combination: a plurality of quantity measuring means each having a sensing means in a separate container and deriving a signal indicative of the quantity of fluid in the container with which said means is associated; a plurality of percentage responsive means each connected to one of said quantity measuring means and deriving a signal indicative of the percentage of fullness of the container with which said percentage responsive means is associated; totalizing means connected to said plurality of quantity measuring means and deriving a signal indicative of the percentage of fullness of all the containers; and a plurality of comparing means each connected to one of said percentage responsive means and to said totalizing means and comparing the percentage of fullness of all the containers with the percentage of fullness of the container with which said comparing means is associated.

2. Apparatus for controlling the flow of fluid from a plurality of containers comprising, in combination: a plurality of quantity measuring means each having a sensing means in a separate container and deriving a signal indicative of the quantity of fluid in the container with which said means is associated; a plurality of percentage responsive means each connected to one of said quantity measuring means and deriving a signal indicative of the percentage of fullness of the container with which said percentage responsive means is associated; totalizing means connected to said plurality of quantity measuring means and deriving a signal indicative of the percentage of fullness of all the containers; a plurality of comparing means each connected to one of said percentage responsive means and to said totalizing means and comparing the percentage of fullness of all the containers with the percentage of fullness of the container with which said comparing means is associated, and a plurality of flow control means each arranged to control the output flow of fluid of one of the containers, each of said comparing means being connected to the flow control means in the output line of the container with which it is associated to control the flow of fluid from that container in accordance with the percentage of fullness of that container in relation to the percentage of fullness of all the containers.

3. Comparing apparatus for a plurality of containers comprising, in combination: a plurality of quantity measuring rebalanceable networks each having a capacitive sensing element inserted in a container and deriving a signal indicative of the quantity of fluid in the container with which said network is associated; a plurality of percentage responsive means each connected to one of said networks and deriving a signal indicative of the percentage of fullness of the container with which it is associated; totalizing means connected to said plurality of networks and deriving a signal indicative of the percentage of fullness of all the containers; and a plurality of comparing means each connected to one of said percentage responsive means and to said totalizing means and comparing the percentage of fullness of all the containers with the percentage of fullness of the container with which said comparing means is associated.

4. Apparatus for controlling the flow of fluid from a plurality of containers comprising, in combination: a plurality of quantity measuring rebalanceable networks each having a capacitive sensing element inserted in a container and deriving a signal indicative of the quantity of fluid in the container with which said network is associated; a plurality of percentage responsive means each connected to one of said networks and deriving a signal indicative of the percentage of fullness of the container with which it is associated; totalizing means connected to said plurality of networks and deriving a signal indicative of the percentage of fullness of all the containers; a plurality of comparing means each connected to one of said percentage responsive means and to said totalizing means and comparing the percentage of fullness of all the containers with the percentage of fullness of the container with which said comparing means is associated, and a plurality of flow control means each arranged to control the output flow of one of the containers, each of said comparing means being connected to the flow control means in the output line of the container with which it is associated to control the flow of fluid from that container in accordance with the percentage of fullness of that container in relation to the percentage of fullness of all the containers.

5. Apparatus for comparing the percentage of fullness of each of a plurality of containers with the percentage of fullness of all the containers comprising, in combination: a plurality of quantity measuring means each having a sensing means in a separate container and a potentiometer from which a signal is derived indicative of the quantity of fluid in the container with which said means is associated; a plurality of individual percentage responsive potentiometers each connected to one of said quantity measuring means and deriving a signal indicative of the percentage of fullness of the container with which said potentiometer is associated; totalizing means connected to said plurality of quantity measuring potentiometers and having a total percentage responsive potentiometer from which a signal is derived indicative of the percentage of fullness of all the containers; and a plurality of comparing means each connected to one of said individual percentage responsive potentiometer and comparing the percentage of fullness of all the containers with the percentage of fullness of the container with which said comparing means is associated.

6. Apparatus for controlling the flow of fluid from a plurality of containers comprising, in combination: a plurality of quantity measuring means each having a sensing means in a separate container and a potentiometer from which a signal is derived indicative of the quantity of fluid in the container with which said means is associated; a plurality of individual percentage responsive potentiometers each connected to one of said quantity measuring means and deriving a signal indicative of the percentage of fullness of the container with which said potentiometer is associated; totalizing means connected to said plurality of quantity measuring potentiometers and having a total percentage responsive potentiometer from which a signal is derived indicative of the percentage of fullness of all the containers; a plurality of comparing means each connected to one of said individual percentage responsive potentiometers and to said total percentage responsive potentiometer and comparing the percentage of fullness of all the containers with the percentage of fullness of the container with which said comparing means is associated, and a plurality of flow control means each arranged to control the output flow of fluid of one of the containers, each of said comparing means being connected to the flow control means in the output line of the container with which it is associated to control the flow of fluid from that container in accordance with the percentage of fullness of that container in relation to the percentage of fullness of all the containers.

7. Apparatus for comparing the percentage of fullness of each of a plurality of containers with the percentage of fullness of all the containers comprising, in combination: a plurality of quantity measuring rebalanceable networks each having a capacitive sensing element inserted in a container and a potentiometer from which a signal is derived indicative of the quantity of fluid in the container with which said network is associated; a plurality of individual percentage responsive potentiometers each connected to one of said networks and deriving a signal indicative of the percentage of fullness of the container with which said potentiometer is associated; totalizing means connected to said plurality of quantity measuring potentiometers and having a total percentage responsive potentiometer from which a signal is derived indicative of the percentage of fullness of all the containers; and a plurality of comparing means each connected to one of said individual percentage responsive potentiometers and to said total percentage responsibe potentiometer and comparing the percentage of fullness of all the containers with the percentage of fullness of the container with which said comparing means is associated.

8. Apparatus for controlling the flow of fluid from a plurality of containers comprising, in combination: a plurality of quantity measuring rebalanceable networks each having a capacitive sensing element inserted in a container and a potentiometer from which a signal is derived indicative of the quantity of fluid in the container with which said network is associated; a plurality of individual percentage responsive potentiometers each connected to one of said networks and deriving a signal indicative of the percentage of fullness of the container with which said potentiometer is associated; totalizing means connected to said plurality of quantity measuring potentiometers and having a total percentage responsive potentiometer from which a signal is derived indicative of the percentage of fullness of all the containers; a plurality of comparing means each connected to one of said individual percentage responsive potentiometers and to said total percentage responsive potentiometer and comparing the percentage of fullness of all the containers with the percentage of fullness of the container with which said comparing means is associated, and a plurality of flow control means each arranged to control the output flow of fluid of one of the containers, each of said comparing means being connected to the flow control means in the output line of the container with which it is associated to control the flow of fluid from that container in accordance with the percentage of fullness of that container in relation to the percentage of fullness of all the containers.

9. Apparatus for controlling the flow of fluid from a plurality of containers comprising, in combination: a plurality of means each including sensing means in a container and deriving a first signal indicative of the quantity of fluid in the container and deriving a second signal indicative of the percentage of fullness of the container; totalizing means connected to said plurality of means and deriving a signal indicative of the percentage of fullness of all the containers; a plurality of flow control means each arranged to control the output flow of one of the containers, and a plurality of comparing means each comparing one of said second signals with said total percentage of fullness signal and connected to control the flow control means in the output line of the container with which the comparing means is associated.

10. Apparatus for controlling the flow of fluid from a plurality of containers comprising, in combination: a plurality of percentage responsive means operatively connected to sensing means in the containers for deriving individual signals indicative of the percentages of fullness of the individual containers; total percentage responsive means operatively connected to the sensing means in the containers for deriving a total signal indicative of the percentage of fullness of all the containers; a plurality of flow control means each arranged to control the output flow of one of the containers, and a plurality of comparing means each comparing one of said individual signals with said total signal and connected to control the flow control means in the output line of the container with which each of said comparing means is associated.

11. In combination: a plurality of containers, sensing means associated with each of the containers, a plurality of percentage responsive means operatively connected to said sensing means in the containers for deriving individual signals indicative of the percentage of fullness of the individual containers; total percentage responsive means operatively connected to said sensing means in the containers for deriving a total signal indicative of the percentage of fullness of all the containers; and a plurality of comparing means each comparing said total percentage of fullness signal with the individual percentage of fullness signal of the container with which said comparing means is associated.

*12. Means for regulating fluid flow from a plurality of simultaneously discharging tanks each having an outlet for fluid flow therefrom, comprising means detecting the fluid level in each of several tanks and creating a fluid level signal for each tank, means creating a reference signal which is a function of the fluid levels in selected tanks, means comparing said fluid level signals with said reference signal and means responsive to any difference between said fluid level signals and said reference signal for adjusting the fluid flow from the respective tank in accordance with said difference.*

*13. Means for regulating fluid flow from a plurality of simultaneously discharging tanks comprising means creating a signal for each tank varying with the liquid level in the respective tank, means producing a reference signal from said created signals, means connecting a created signal with said reference signal including means producing a resultant signal indicating departure of said created signal from said reference signal, flow control means for each tank, means connecting the resultant signal and the flow control means of each tank including means actuated by the resultant signal for actuating its connected flow control means to regulate the flow from its associated tank to equalize the fluid level in the associated tank with the fluid level in other tanks.*

*14. Means for regulating the fluid flow from a plurality of simultaneously discharging tanks comprising an individual transducer for each tank for producing an electrical signal which is a function of the fluid level in the respective tank, means for producing a reference electrical signal which is a function of the fluid level in selected tanks, means comparing the signal from individual tanks with the reference signal and producing individual resultant electrical signals, flow control means for each tank and means responsive to said individual resultant signals for actuating said flow control means of the respective tank.*

*15. Means for regulating the fluid flow from a plurality of simultaneously discharging tanks comprising an individual transducer for each tank for producing electrical signals which are a function of the fluid level in the respective tank, means for comparing signals from selected tanks for producing a reference signal, means comparing signals from individual tanks with the reference signal and producing resultant signals for individual tanks, flow control means for the individual tanks and means responsive to said resultant signal for an individual tank for actuating said flow control means to control the flow from the individual tank associated with said resultant signal.*

*16. Means for regulating the fluid flow from a plurality of simultaneously discharging tanks comprising an individual transducer for each tank for producing electrical signals which are a function of the fluid level in the respective tanks, means for combining the signals from selected tanks for producing a reference signal, means comparing signals from individual tanks with the reference signal and producing resultant signals for individual tanks, flow control means for the individual tanks and means responsive to said resultant signals for individual tanks for actuating said flow control means to control the flow from the individual tank.*

*17. Means for maintaining the center of gravity position of several spaced liquid containing tanks while being simultaneously emptied comprising means creating a pair of signals for each tank each half of the pair varying with the liquid level in that tank, means producing a reference signal from one half of selected ones of the several pairs of signals, flow control means for each tank, and means responsive to any signal of the other half of the pairs of signals departing from said reference signal for actuating the flow control means to control the flow from the tank producing the departing signal.*

(References on following page)

References Cited in the file of this patent or the original patent

UNITED STATES PATENTS

| | | |
|---|---|---|
| 2,641,271 | Pressler | June 9, 1953 |
| 2,652,555 | Smith | Sept. 15, 1953 |
| 2,656,977 | Cummings | Oct. 27, 1953 |

OTHER REFERENCES

"Modern Aircraft Fuel Gaging" by Sanford Solaz, pages 54 and 55, vol. 65, September 1952 Aero Digest, published by Aeronautical Digest Publishing Corp., 515 Madison Avenue, New York, New York.